(12) United States Patent
Gharavi et al.

(10) Patent No.: US 9,967,087 B2
(45) Date of Patent: *May 8, 2018

(54) WIRELESS RECEIVER USING LOW RESOLUTION ANALOG-TO-DIGITAL CONVERTERS

(71) Applicant: Movandi Corporation, Newport Beach, CA (US)

(72) Inventors: Sam Gharavi, Irvine, CA (US); Farid Shirinfar, Granada Hills, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US); Ahmadreza Rofougaran, Newport Coast, CA (US)

(73) Assignee: Movandi Corporation, Newport Beach, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/715,049

(22) Filed: Sep. 25, 2017

(65) Prior Publication Data

US 2018/0048458 A1     Feb. 15, 2018

Related U.S. Application Data

(63) Continuation of application No. 15/232,054, filed on Aug. 9, 2016.

(51) Int. Cl.
*H04B 1/10* (2006.01)
*H04L 7/04* (2006.01)
*H01Q 21/22* (2006.01)
*H04L 5/00* (2006.01)

(52) U.S. Cl.
CPC ............. *H04L 7/048* (2013.01); *H01Q 21/22* (2013.01); *H04L 5/006* (2013.01)

(58) Field of Classification Search
CPC .......... H04L 7/048; H04L 5/006; H01Q 21/22
See application file for complete search history.

(56) References Cited

U.S. PATENT DOCUMENTS 5,077,562 A * 12/1991 Chang ................. H01Q 3/26
342/195
2006/0256844 A1 * 11/2006 Shimizu ............. H04B 1/71637
375/152

* cited by examiner

*Primary Examiner* — Nguyen Vo
(74) *Attorney, Agent, or Firm* — Farjami & Farjami LLP (57) ABSTRACT

A wireless receiver is disclosed. The wireless receiver includes a phased array antenna panel having a plurality of antennas, and a low resolution analog-to-digital (A/D) converter coupled to each of the plurality of antennas, where the low resolution A/D converter is configured to provide a digital output based on comparing a reference value with a sum of noise value and signal value of an analog input received by the corresponding one of the plurality of antennas. Noise signals received by the plurality of antennas are uncorrelated, and a signal to noise ratio (SNR) of the analog input can be less than one. The low resolution A/D converter can be a one-bit A/D converter. The one-bit A/D converter can be a comparator receiving the sum of noise value and signal value as one comparator input, and receiving the reference value as another comparator input.

13 Claims, 6 Drawing Sheets

WIRELESS RECEIVER USING LOW RESOLUTION ANALOG-TO-DIGITAL CONVERTERS

The present application is a continuation application of U.S. patent application Ser. No. 15/232,054, titled "Wireless Phased Array Receiver Using Low Resolution Analog-to-Digital Converters," filed on Aug. 9, 2016. The above-identified application is hereby incorporated fully by reference into the present application.

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection." The disclosures of these related applications are hereby incorporated fully by reference into the present application.

BACKGROUND

A wireless phased array receiver consisting of multiple receiving antennas provides several benefits such as signal to noise ratio ("SNR") improvement, beam steering, spatial filtering and interference rejection. Phased arrays can be implemented in several architectures including but not limited to radio frequency ("RF") beamforming, intermediate frequency ("IF") beamforming and digital beamforming. The digital beamforming ("DBF") architecture provides various advantages over other phased array architectures. The DBF is generally a more flexible and scalable beamforming architecture compared with, for example, RF beamforming and IF beamforming architectures. Further, by eliminating the need for several analog phase shifting and combining paths per antenna, DBF is a very suitable architecture for phased array systems with multiple beams. One impediment for implementing the DBF, in particular for larger phased arrays (those with more than 10 antennas), has been the prohibitive total power consumption of a large number of analog-to-digital ("A/D") converters. This is because in DBF, unlike other phased array architectures, one A/D is required per antenna. Thus, there is need in the art to overcome impediments in implementing digital beamforming in large phased array receivers and to enable an advantageous DBF architecture for large phased arrays.

SUMMARY

The present disclosure is directed to wireless phased array receivers using low resolution analog-to-digital (A/D) converters, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
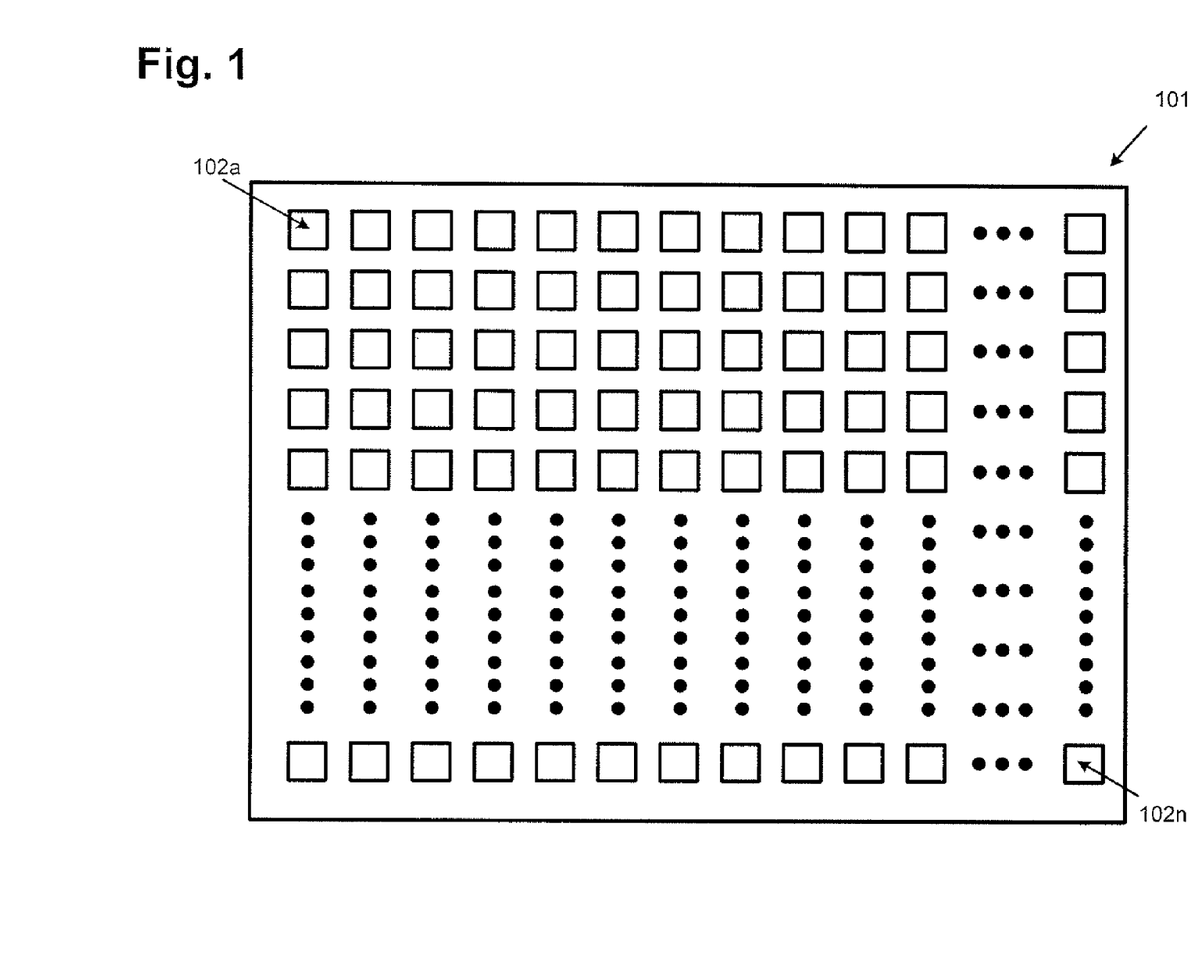
FIG. 1 illustrates a top plan view of a portion of an antenna phased array panel of an exemplary wireless receiver according to one implementation of the present application.

Referring to FIG. 1, FIG. 1 illustrates a top plan view of a portion of a phased array antenna panel (also referred to simply as an "antenna panel" herein) of an exemplary wireless receiver according to one implementation of the present application. As illustrated in FIG. 1, antenna panel 101 includes a plurality of antennas, e.g., antennas 102a through 102n, collectively referred to as antennas 102. In one implementation, antennas 102 may be configured to receive signals from one or more wireless transmitters, such as commercial geostationary communication satellites or low earth orbit satellites having a very large bandwidth in the 10 GHz to 20 GHz frequency range and a very high data rate. In another implementation, antennas 102 may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

In one implementation, for a wireless transmitter transmitting signals at 10 GHz (i.e., $\lambda=30$ mm), each antenna in antenna panel 101 in a wireless receiver needs an area of at least a quarter wavelength (e.g., $\lambda/4=7.5$ mm) by a quarter wavelength (e.g., $\lambda/4=7.5$ mm) to receive the transmitted signals. As illustrated in FIG. 1, antennas 102 in antenna panel 101 may each have a square shape having dimensions of 7.5 mm by 7.5 mm, for example. In one implementation, each adjacent pair of antennas 102 may be separated by a distance of a multiple integer of the quarter wavelength (i.e., $n*\lambda/4$), such as 7.5 mm, 15 mm, 22.5 mm, and etc. As illustrated in FIG. 1, antenna panel 101 includes a total of N spatially separated antennas 102. In one implementation, the number of antennas 102 can be as small as 2. In another implementation, the number of antennas 102 can be as large as several thousands (e.g., N=2000). In general, the performance of the wireless receiver improves with the number, N, of antennas 102 in antenna panel 101.

In the present implementation, antenna panel 101 is a flat panel array employing antennas 102, where antenna panel 101 is coupled to associated active circuits to form a beam for reception and/or transmission. In one implementation, the beam is formed fully electronically by means of phase and amplitude control circuits associated with antennas 102. Thus, antenna panel 101 can provide for beamforming without the use of any mechanical parts.

Figure 2A:
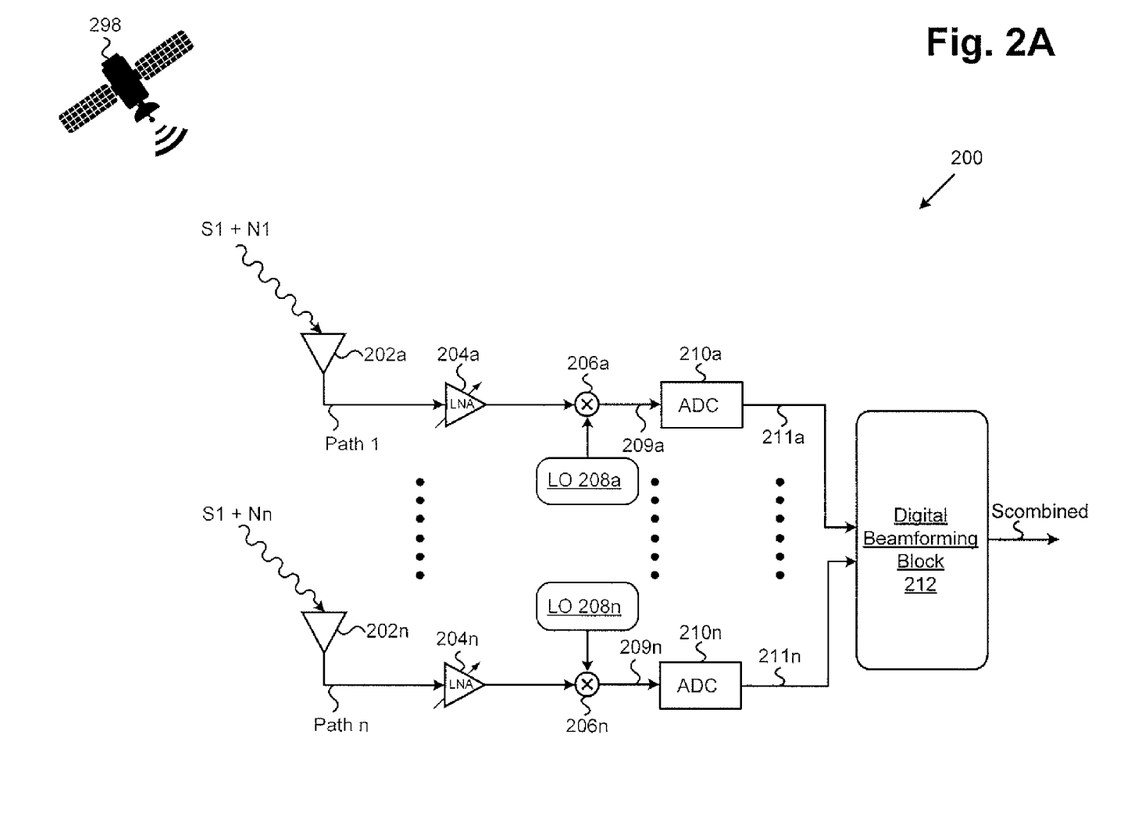
FIG. 2A illustrates a functional block diagram of a portion of an exemplary wireless receiver according to one implementation of the present application.

Referring to FIG. 2A, FIG. 2A illustrates a functional block diagram of a portion of an exemplary wireless receiver according to one implementation of the present application. As illustrated in FIG. 2A, wireless receiver 200 includes antennas 202a through 202n, each coupled to digital beamforming block 212 through paths 1 through n, respectively. In the present implementation, antennas 202a through 202n in FIG. 2A may correspond to antennas 102a through 102n, respectively, in antenna panel 101 shown in FIG. 1. In the present implementation, each of antennas 202a through 202n may receive one or more signals from wireless transmitter 298, such as a commercial geostationary communication satellites or a low earth orbit satellite.

In one implementation, wireless transmitter 298 may employ linearly-polarized or circularly polarized signals, such as single or dual linearly-polarized signals. As illustrated in FIG. 2A, low resolution A/D converters 210a through 210n are coupled to respective antennas 202a through 202n, where low resolution A/D converters 210a through 210n are configured to provide digital outputs 211a through 211n, respectively, to digital beamforming block 212. In the present implementation, low resolution A/D converters 210a through 210n comprise one-bit A/D converters, such as a single comparator, for example a complementary metal-oxide-semiconductor (CMOS) comparator. In other implementations, low resolution A/D converters 210a through 210n comprise two-bit or three-bit A/D converters. Digital beamforming block 212 includes n parallel paths for receiving respective digital outputs 211a through 211n, and provides combined signal $S_{combined}$ for further signal processing.

In the example presented by FIG. 2A, antennas 202a through 202n are single feed antennas for receiving single linear-polarized signals, such as a horizontally-polarized (H) signal having its electric-field oriented parallel with the equatorial plane or a vertically-polarized (V) signal having its electric-field oriented perpendicular to the equatorial plane. As illustrated in FIG. 2A, signal S1 received by each of antennas 202a through 202n is accompanied by uncorrelated noises N1 through Nn, respectively. For example, antenna 202a receives signal S1 from wireless transmitter 298, where signal S1 is accompanied by noise N1. Signal S1 and noise N1 are provided to LNA 204a, which is configured to generate an amplified output to mixer 206a. Mixer 206a and local oscillator 208a are configured to downconvert the frequency of the amplified output from LNA 204a, for example, from radio frequency to intermediate frequency. Mixer 206a then provides downconverted analog input 209a to low resolution A/D converter 210a. Low resolution A/D converter 210a converts analog input 209a to digital output 211a, and provides digital output 211a to digital beamforming block 212 for digital beamforming.

Similarly, antenna 202n receives signal S1 from wireless transmitter 298, where signal S1 is accompanied by noise Nn. Signal S1 and noise Nn are provided to LNA 204n, which is configured to generate an amplified output to mixer 206n. Mixer 206n and local oscillator 208n are configured to downconvert the frequency of the amplified output from LNA 204n, for example, from radio frequency to intermediate frequency. Mixer 206n then provides downconverted analog input 209n to low resolution A/D converter 210n. Low resolution A/D converter 210n converts analog input 209n to digital output 211n, and provides digital output 211n to digital beamforming block 212 for digital beamforming.

It should be noted that, although FIG. 2A shows antennas 202a through 202n as single feed antennas, in another implementation, antennas 202a through 202n may be dual feed antennas with dual polarization feeds for a horizontally-polarized (H) signal and a vertically-polarized (V) signal. In that case, a signal accompanied by a noise received at each antenna and provided at each polarization feed passes through a separate LNA, mixer and A/D converter for each polarization.

Figure 2B:
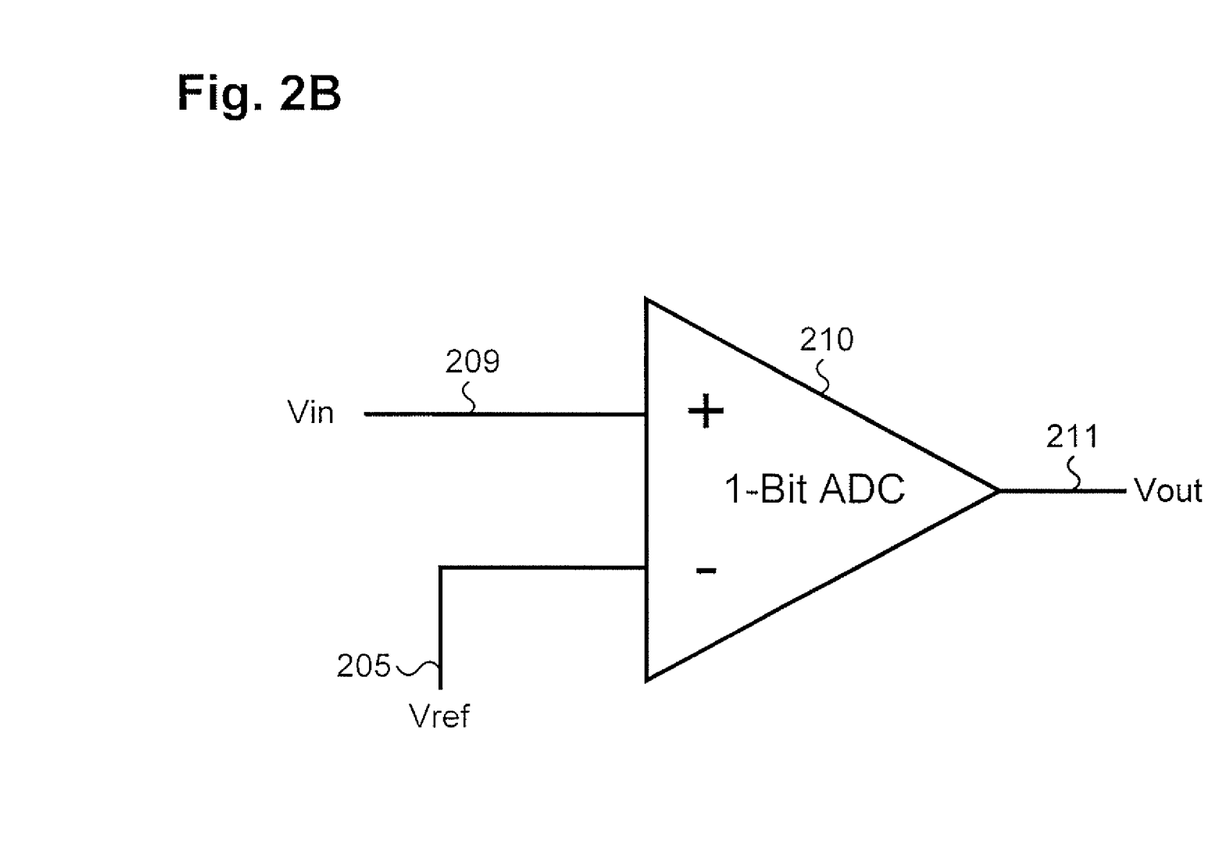
FIG. 2B illustrates a functional block diagram of an exemplary low resolution analog-to-digital converter according to one implementation of the present application.

Referring to FIG. 2B, FIG. 2B illustrates a functional block diagram of an exemplary low resolution analog-to-digital converter according to one implementation of the present application. In one implementation, low resolution A/D converter 210 may correspond to any of low resolution A/D converters 210a through 210n in wireless receiver 200 shown in FIG. 2A. As illustrated in FIG. 2B, low resolution A/D converter 210 receives analog input 209 (Vin) and a reference signal having reference value 205 (Vref) as inputs, and provides digital output 211 (Vout) to, for example, a digital beamforming block for digital beamforming. As an example, analog input 209 (Vin) may correspond to analog input 209a received from antenna 202a in FIG. 2A. Low resolution A/D converter 210 may correspond to low resolution A/D converter 210a in FIG. 2A. Low resolution A/D converter 210 is configured to provide digital output 211, for example, based on comparing reference value 205 (Vref) with the sum of signal S1 and noise N1 of analog input 209a (Vin) received from antenna 202a in FIG. 2A.

In the present implementation, low resolution A/D converter 210 comprises a one-bit A/D converter, such as a single comparator. In one implementation, low resolution A/D converter 210 comprises a complementary metal-oxide-semiconductor (CMOS) comparator. In another implementation, low resolution A/D converter 210 may be a two-bit or three-bit A/D converter.

Figure 2C:
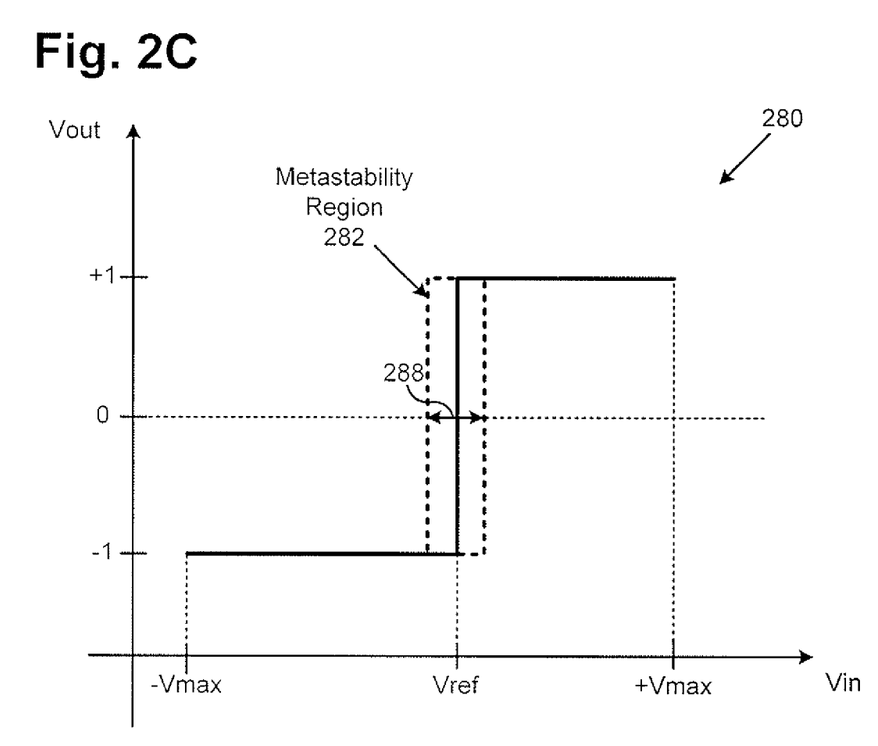
FIG. 2C illustrates an exemplary input-output waveform of a low resolution analog-to-digital converter according to one implementation of the present implementation.

Referring to FIG. 2C, FIG. 2C illustrates an exemplary input-output waveform of a low resolution A/D converter according to one implementation of the present implementation. In the present implementation, a low resolution A/D converter compares an analog input (Vin) to a reference value (Vref), and provides a digital output (Vout). As illustrated in waveform 280, the low resolution A/D converter, such as low resolution A/D converter 210 in FIG. 2B, generates a "+1" output for analog input (Vin) voltages between approximately Vref and +Vmax. The low resolution A/D converter generates a "−1" output for analog input (Vin) voltages between −Vmax and approximately Vref. In one implementation, the low resolution A/D converter generates a "0" output (instead of a "−1" output) for analog input (Vin) voltages between −Vmax and approximately Vref. It should be understood that the low-resolution A/D converter may have metastability region 282 where the digital outputs may be subject to small disturbances of the analog inputs and the A/D converter itself. In one implementation, metastability region 282 may have width 288 of approximately 1 to 3 mV ($10^{-3}$ Volts), for example.

Figure 2D:
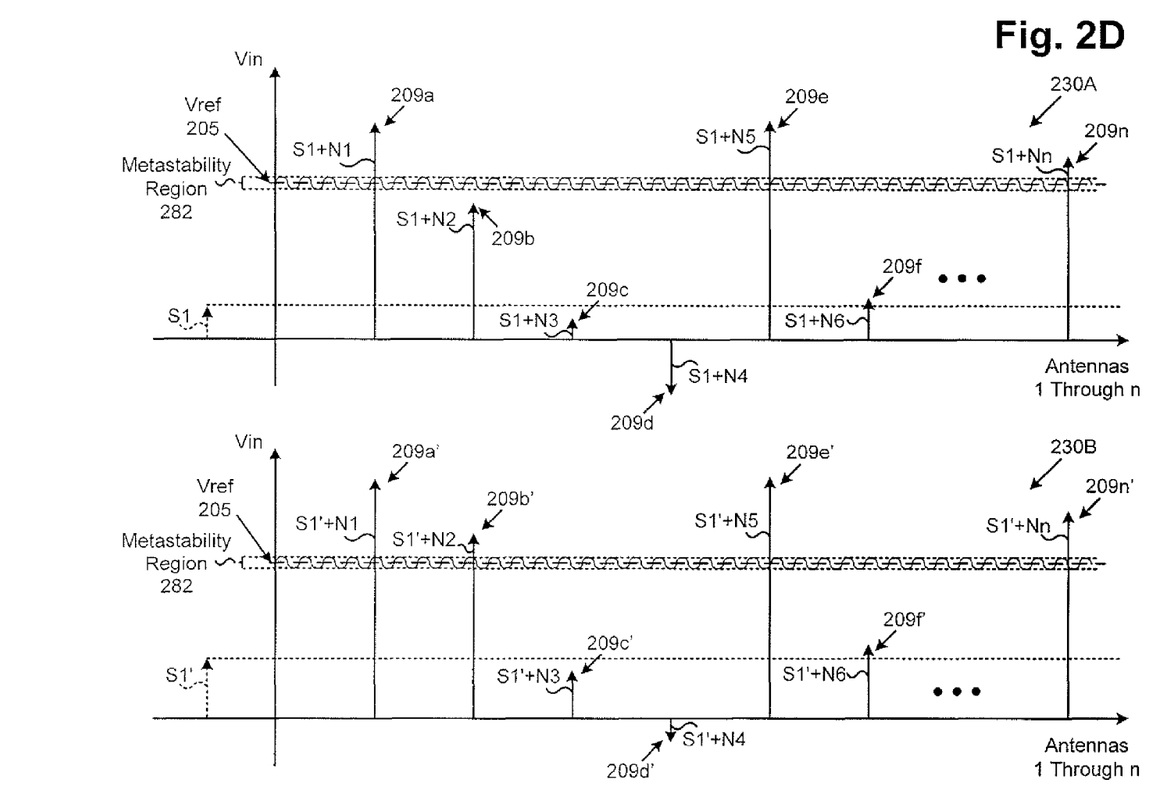
FIG. 2D illustrates diagrams of analog inputs in comparison with a reference value of a low resolution analog-to-digital converter according to one implementation of the present implementation.

Referring to FIG. 2D, FIG. 2D illustrates diagrams of analog inputs in comparison with a reference value of a low resolution A/D converter, for example low resolution A/D converter 210 comprising a one-bit A/D converter, such as a single comparator, as shown in FIG. 2B, according to one implementation of the present application. As shown in FIG. 2D, diagram 230A illustrates analog inputs 209a, 209b, 209c, 209d, 209e, 209f ... 209n (collectively referred to as analog inputs 209a through 209n) received from respective antennas 202*a* through 202*n* of an antenna panel of a wireless receiver. In the present implementation, analog inputs 209*a* through 209*n* in diagram 230A may correspond to analog inputs 209*a* through 209*n* in FIG. 2A and/or analog input 209 in FIG. 2B. In the present implementation, reference value 205 (Vref) and metastability region 282 may correspond to reference value 205 (Vref) and metastability region 282, respectively, in FIGS. 2B and 2C. It should be noted that, in the present implementation, as shown in diagram 230A, each of analog inputs 209*a* through 209*n* may be substantially equal to the sum of signal S1 and the correspond noise received at each of antennas 202*a* through 202*n*, respectively. For example, analog input 209*a* may be substantially equal to the sum of signal S1 and noise N1 received from antenna 202*a* in FIG. 2A. Similarly, analog input 209*n* may be substantially equal to the sum of signal S1 and noise Nn received from antenna 202*n* in FIG. 2A.

In the example shown in diagram 230A, the voltage level of signal S1 received at each antenna 202*a* through 202*n* is substantially below reference value 205 (Vref), which means that, without taking into account the corresponding noise levels accompanying signal S1 at each antenna, none of signal S1 values received from antennas 202*a* through 202*n* would be able to result in a "+1" output from the corresponding converter. In a conventional high resolution A/D converter, such a low signal level would require one or more variable gain amplifiers and feedback loops to amplify the weak signal to a detectable level to trigger the comparators in the high resolution A/D converter, which would consume a significant amount of power and result in reduced conversion speed. According to the novel approach of the present implementation, however, the low resolution A/D converters, such as low resolution A/D converters 210*a* through 210*n* in FIG. 2A, are configured to compare an analog input, which is the sum of a signal value and a corresponding noise value, to a reference value that is selected based on the noise value, which is dominant over the signal value in the analog input. In other words, each low resolution A/D converter in the present implementation is triggered primarily by the presence of the dominant noise value as opposed to the signal value itself. It should be noted that, in the present implementation, noise N1 through noise Nn received by antennas 202*a* through 202*n*, respectively, are uncorrelated, and further the SNR is low, and is generally less than one (negative in dB scale).

As illustrated in diagram 230A, analog input 209*a* includes signal S1 and noise N1. While signal S1 alone is substantially less than reference value 205, the sum of noise N1 and signal S1 brings analog input 209*a* above reference value 205. As such, a corresponding low resolution A/D converter, such as low resolution A/D converter 210*a* in wireless receiver 200 of FIG. 2A, would provide a "+1" output based on analog input 209*a* dominated by noise N1. For analog input 209*b* having signal S1 and noise N2, the sum of signal S1 and noise N2 is below reference value 205. Thus, a corresponding low resolution A/D converter, for example, in wireless receiver 200 of FIG. 2A would provide a "-1" output (or a "0" output in some implementations) based on analog input 209*b*. For analog input 209*c* having signal S1 and noise N3, the sum of signal S1 and noise N3 is below reference value 205. Thus, a corresponding low resolution A/D converter, for example, in wireless receiver 200 of FIG. 2A would provide a "-1" output (or a "0" output in some implementations) based on analog input 209*c*. For analog input 209*d* having signal S1 and noise N4, the sum of signal S1 and noise N4 is below reference value 205. Thus, a corresponding low resolution A/D converter, for example, in wireless receiver 200 of FIG. 2A would provide a "-1" output (or a "0" output in some implementations) based on analog input 209*d*. For analog input 209*e* having signal S1 and noise N5, the sum of noise N5 and signal S1 brings analog input 209*e* above reference value 205. As such, a corresponding low resolution A/D converter, for example, in wireless receiver 200 of FIG. 2A would provide a "+1" output based on analog input 209*e* dominated by noise N5. For analog input 209*f* having signal S1 and noise N6, the sum of signal S1 and noise N6 is below reference value 205. Thus, a corresponding A/D converter, for example, in wireless receiver 200 of FIG. 2A would provide a "-1" output (or a "0" output in some implementations) based on analog input 209*f*. For analog input 209*n* having signal S1 and noise Nn, the sum of noise Nn and signal S1 brings analog input 209*n* above reference value 205. As such, a corresponding low resolution A/D converter, such as low resolution A/D converter 210*n* in wireless receiver 200 of FIG. 2A, would provide a "+1" output based on analog input 209*n* dominated by noise Nn.

As shown in diagram 230A, although signal S1 is substantially below reference value 205, because analog inputs 209*a*, 209*e* and 209*n* are substantially dominated by noises N1, N5 and Nn, respectively, each of the sum of signal S1 and noise N1, the sum of signal S1 and noise N5, and the sum of signal S1 and noise Nn, exceeds reference value 205. Thus, analog inputs 209*a*, 209*e* and 209*n* each result in a corresponding low resolution A/D converter generating a "+1" output without the need for variable gain amplifiers and feedback loops. Thus, in the example shown in diagram 230A, signal S1 results in a "-1" output (or a "0" output in some implementations) generated by the four low resolution A/D converters 210*b*, 210*c*, 210*d*, and 210*f*, and a "+1" output generated by the three low resolution A/D converters 210*a*, 210*e*, and 210*n*.

In the example shown in diagram 230B of FIG. 2D, analog inputs 209*a*', 209*b*', 209*c*', 209*d*', 209*e*', 209*f*' . . . 209*n*' (collectively referred to as analog inputs 209*a*' through 209*n*') are received from respective antennas 202*a* through 202*n* of an antenna panel of a wireless receiver. In the present example, analog inputs 209*a*' through 209*n*' in diagram 230B are based on a new signal S1' received at antennas 202*a* through 202*n*. For the purpose of illustration of the operation of low resolution A/D converters 210*a* through 210*n*, noise N1 through Nn is assumed to be substantially equal to noise N1 through Nn, respectively, for signal S1 in diagram 230A.

As shown in the example of diagram 230B, signal S1' is slightly greater than signal S1. However, the voltage level of signal S1' is still substantially below reference value 205 (Vref), which means that, without taking into account the corresponding noise levels accompanying signal S1' at each antenna, none of signal S1' values received from antennas 202*a* through 202*n* would be able to result in a "+1" output from the corresponding A/D converter. According to the novel approach of the present implementation, the low resolution A/D converters, such as low resolution A/D converters 210*a* through 210*n* in FIG. 2A, are configured to compare the analog input, which is the sum of the signal value and the corresponding noise value, to the reference value that is selected based on the noise value, which is dominant over the signal value in the analog input. Thus, each low resolution A/D converter is triggered primarily by the presence of the dominant noise value as opposed to the signal value itself. It should be noted that, in the present implementation, noise N1 through noise Nn received by antennas 202a through 202n, respectively, are uncorrelated, and further the SNR is low, and is generally less than one.

As illustrated in diagram 230B, analog input 209a' includes signal S1' and noise N1. While signal S1' alone is substantially less than reference value 205, the sum of noise N1 and signal S1' brings analog input 209a' above reference value 205. As such, a corresponding low resolution A/D converter, such as low resolution A/D converter 210a in wireless receiver 200 of FIG. 2A, would provide a "+1" output based on analog input 209a' dominated by noise N1. For analog input 209b' having signal S1' and noise N2, while signal S1' alone is less than reference value 205, the sum of noise N2 and signal S1' brings analog input 209b' above reference value 205. Thus, a corresponding low resolution A/D converter in wireless receiver 200 of FIG. 2A would provide a "+1" output based on analog input 209b' dominated by noise N2. For analog input 209c' having signal S1' and noise N3, the sum of signal S1' and noise N3 is below reference value 205. Thus, a corresponding low resolution A/D converter, for example, in wireless receiver 200 of FIG. 2A would provide a "−1" output (or a "0" output in some implementations) based on analog input 209c'. For analog input 209d' having signal S1' and noise N4, the sum of signal S1' and noise N4 is below reference value 205. Thus, a corresponding low resolution A/D converter, for example, in wireless receiver 200 of FIG. 2A would provide a "−1" output (or a "0" output in some implementations) based on analog input 209d'. For analog input 209e' having signal S1' and noise N5, the sum of noise N5 and signal S1' brings analog input 209e' above reference value 205. As such, a corresponding low resolution A/D converter, for example, in wireless receiver 200 of FIG. 2A would provide a "+1" output based on analog input 209e' dominated by noise N5. For analog input 209f' having signal S1' and noise N6, the sum of signal S1' and noise N6 is below reference value 205. Thus, a corresponding low resolution A/D converter, for example, in wireless receiver 200 of FIG. 2A would provide a "−1" output (or a "0" output in some implementations) based on analog input 209f'. For analog input 209n' having signal S1' and noise Nn, the sum of noise Nn and signal S1' brings analog input 209n' above reference value 205. As such, a corresponding low resolution A/D converter, such as low resolution A/D converter 210n in wireless receiver 200 of FIG. 2A, would provide a "+1" output based on analog input 209n' dominated by noise Nn.

As shown in diagram 230B, although signal S1' is substantially below reference value 205, because analog inputs 209a', 209b', 209e' and 209n' are substantially dominated by noises N1, N2, N5 and Nn, respectively, each of the sum of signal S1' and noise N1, the sum of signal S1' and noise N2, the sum of signal S1' and noise N5, and the sum of signal S1' and noise Nn, exceeds reference value 205. Thus, analog inputs 209a', 209b', 209e' and 209n' each result in a corresponding low resolution A/D converter generating a "+1" output without the need for variable gain amplifiers and feedback loops. Thus, in the example shown in diagram 230B, signal S1' results in a "−1" output (or a "0" output in some implementations) generated by the three low resolution A/D converters 210c, 210d, and 210f, and a "+1" output generated by the four low resolution A/D converters 210a, 210b, 210e, and 210n. Thus, it can be seen from this example that when the outputs of the array of multiple low-resolution A/D converters (one-bit A/D converters in the form of comparators in this case) are aligned in time and combined together using the digital beamforming block, the combined output signal of the digital beamforming block will have a higher value for signal S1' compared to signal S1. This is because the noise values from different A/D paths 1 through n are random and are uncorrelated and when all paths 1 through n are combined, the signal (S1 or S1' in these examples) will determine the number of comparators that generate a value of "+1".

Thus, according to various implementations of the present application, since the low resolution A/D converters, for example low resolution A/D converter 210 of FIG. 2B comprising a one-bit A/D converter, such as a single comparator, are designed to trigger based on the sum of the noise values and the signal values of the analog inputs, in particular, when the noise values are substantially greater than the signal values (i.e., the SNR of the analog input is less than one), the low resolution A/D converters do not require programmable gain amplifiers and feedback loops, and thus substantially reduce power consumption, in addition to the power consumption saving provided by the low-resolution A/D converters themselves compared to their high-resolution counterparts.

Figure 3:
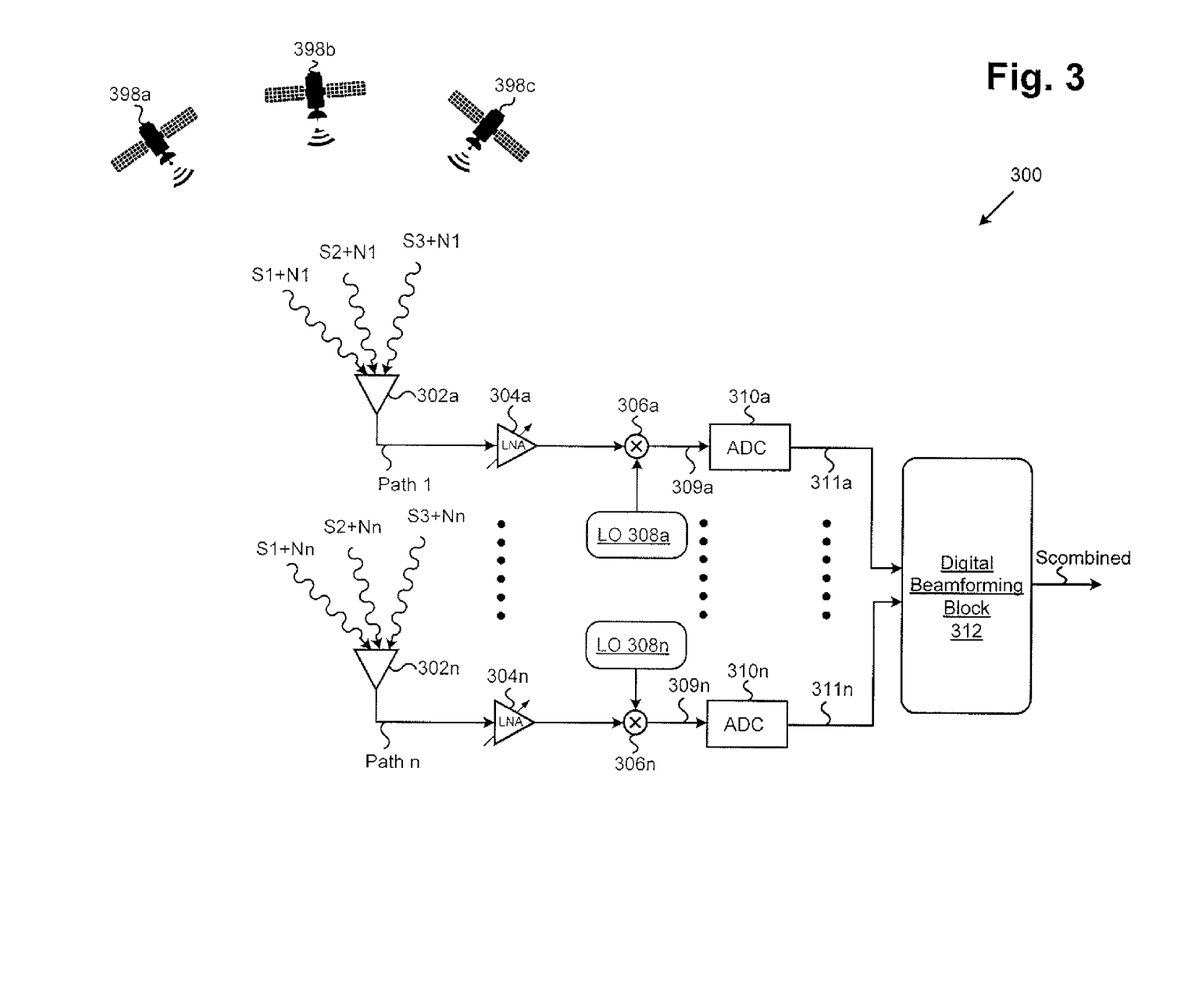
FIG. 3 illustrates a functional block diagram of a portion of an exemplary wireless receiver according to one implementation of the present application.

FIG. 3 illustrates a functional block diagram of a portion of an exemplary wireless receiver according to one implementation of the present application. As illustrated in FIG. 3, wireless receiver 300 includes antennas 302a through 302n, each coupled to digital beamforming block 312 through paths 1 through n, respectively. In the present implementation, antennas 302a through 302n in FIG. 3 may correspond to antennas 102a through 102n, respectively, in antenna panel 101 shown in FIG. 1. In the present implementation, each of antennas 302a through 302n may receive one or more signals from each of wireless transmitters 398a, 398b and 398c, such as commercial geostationary communication satellites or low earth orbit satellites. In one implementation, each of wireless transmitters 398a, 398b and 398c may employ linearly-polarized signals, such as single or dual linearly-polarized signals. As illustrated in FIG. 3, low resolution A/D converters 310a through 310n are coupled to respective antennas 302a through 302n, where low resolution A/D converters 310a through 310n are configured to provide digital outputs 311a through 311n, respectively, to digital beamforming block 312. Digital beamforming block 312 includes n parallel paths for receiving respective digital outputs 311a through 311n, and provides combined signal $S_{combined}$ for further signal processing.

In the example of FIG. 3, antennas 302a through 302n are single feed antennas for receiving single linear-polarized signals, such as a horizontally-polarized (H) signal having its electric-field oriented parallel with the equatorial plane or a vertically-polarized (V) signal having its electric-field oriented perpendicular to the equatorial plane. As illustrated in FIG. 3, signal S1 received by each of antennas 302a through 302n is accompanied by uncorrelated noises N1 through Nn, respectively. For example, antenna 302a receives signal S1 from wireless transmitter 398a, where signal S1 is accompanied by noise N1. Signal S1 and noise N1 are provided to LNA 304a, which is configured to generate an amplified output to mixer 306a. Mixer 306a and local oscillator 308a are configured to downconvert the frequency of the amplified output from LNA 304a, for example, from radio frequency to intermediate frequency. Mixer 306a then provides downconverted analog input 309a to low resolution A/D converter 310a. Low resolution A/D converter 310a converts analog input 309a to digital output 311a, and provides digital output 311a to digital beamforming block 312 for digital beamforming. As shown in FIG. 3, antenna 302a also receives signal S2 from wireless transmitter 398b where signal S2 is accompanied by noise N1. Antenna 302a further receives signal S3 from wireless transmitter 398c where signal S3 is accompanied by noise N1, and provides them to digital beamforming block 312 through path 1 for digital beamforming.

Similarly, antenna 302n receives signal S1 from wireless transmitter 398a, where signal S1 is accompanied by noise Nn. Signal S1 and noise Nn are provided to LNA 304n, which is configured to generate an amplified output to mixer 306n. Mixer 306n and local oscillator 308n are configured to downconvert the frequency of the amplified output from LNA 304n, for example, from radio frequency to intermediate frequency. Mixer 306n then provides downconverted analog input 309n to low resolution A/D converter 310n. Low resolution A/D converter 310n converts analog input 309n to digital output 311n, and provides digital output 311n to digital beamforming block 312 for digital beamforming. As shown in FIG. 3, antenna 302n also receives signal S2 from wireless transmitter 398b where signal S2 is accompanied by noise Nn. Antenna 302n further receives signal S3 from wireless transmitter 398c where signal S3 is accompanied by noise Nn, and provides them to digital beamforming block 312 through path n for digital beamforming.

It should be noted that, although FIG. 3 shows antennas 302a through 302n as single, feed antennas, in another implementation, antennas 302a through 302n may be dual feed antennas with dual polarization feeds for a horizontally-polarized (H) signal and a vertically-polarized (V) signal. In that case, a signal accompanied by a noise received at each antenna and provided at each polarization feed passes through a separate LNA, mixer and A/D converter for each polarization.

As shown in FIG. 3, wireless receiver 300 includes multiple antennas 302a through 302n each receiving signals S1, S2 and S3 from multiple wireless transmitters 398a, 398b and 398c, where signals S1, S2 and S3 generally have an SNR greater than one. Wireless transmitters 398a, 398b and 398c may send respective signals S1, S2 and S3 to each of antennas 302a through 302n, for example, using different channels within a frequency band. In the present implementation, since signals S1, S2 and S3 each have an SNR that is greater than one, the noise accompanying each signal is not dominant and can be substantially lower than the signal in the analog input provided to the corresponding A/D converter. Thus, assuming that signal S1 is a desired signal over signals S2 and S3, low resolution A/D converters 310a through 310n and digital beamforming block 312 of wireless receiver 300 may treat signals S2 and S3 as uncorrelated noises, so that signals S2 and S3 may have substantially the same effect as the uncorrelated dominant noises accompanying the signals transmitted from the single wireless transmitter in the implementation described with reference to FIGS. 2A through 2D, where the SNR was less than one.

In addition, as signals S1, S2 and S3 are provided to digital beamforming block 312 through paths 1 through n, digital beamforming block 312 has parallel paths to process the digital outputs from low resolution A/D converters 310a through 310n for each of the converted digital signals S1, S2 and S3. Since signals S1, S2 and S3 arrive at antennas 302a through 302n from respective wireless transmitters 398a, 398b and 398c from different directions (i.e. different incident angles), the different directions result in different path delays at antennas 302a through 302n. Based on these different path delays, digital beamforming block 312 may determine the direction at which each of signals S1, S2 and S3 arrives. Digital beamforming block 312 may function as a spatial filter to isolate the digital outputs of the desired signal (e.g., signal S1) from the digital outputs of the other signals (e.g., signals S2 and S3). For example, digital beamforming block 312 may coherently add the digital outputs coming from a particular direction (for example, signal S1 from wireless transmitter 398a), while incoherently adding digital outputs coming from other directions (for example, signal S2 from wireless transmitter 398b and signal S3 from wireless transmitter 398c). Although only three wireless transmitters 398a, 398b, and 398c are shown in FIG. 3, in another implementation, wireless receiver 300 may receive signals from more than three wireless transmitters.

In one implementation, low resolution A/D converters 310a through 310n may be one-bit A/D converters. In another implementation, low resolution A/D converters 310a through 310n may be two-bit or three-bit A/D converters. Low resolution A/D converters 310a through 310n do not require programmable gain amplifiers or feedback loops, thus substantially reducing power consumption and increasing conversion speed, while reducing the required semiconductor area.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless receiver comprising:
an antenna panel comprising a plurality of antennas;
a plurality of one-bit analog-to-digital (A/D) converters;
at least some of said plurality of antennas being coupled to a corresponding one of said plurality of one-bit A/D converters;
wherein said plurality of one-bit A/D converters are configured to provide digital outputs based on comparing a respective reference value with a respective sum of noise value and signal value of a respective analog input received by each said plurality of one-bit A/D converters;
wherein said respective reference value is selected based on said noise value.

2. The wireless receiver of claim 1, wherein each said plurality of one-bit A/D converters comprises a respective comparator receiving said respective sum of noise value and signal value as one comparator input, and receiving said respective reference value as another comparator input.

3. The wireless receiver of claim 1, wherein a signal to noise ratio (SNR) of said respective analog input is less than one.

4. The wireless receiver of claim 3, wherein said respective reference value is substantially above said signal value.

5. The wireless receiver of claim 1, wherein said respective reference value is substantially above said signal value.

6. The wireless receiver of claim 1, wherein said plurality of antennas receive uncorrelated noise.

7. The wireless receiver of claim 1, wherein said plurality of antennas receive signals from a single wireless transmitter accompanied by uncorrelated noise.

8. The wireless receiver of claim 1, wherein said plurality of antennas receive signals from a single wireless transmitter accompanied by uncorrelated noise, and wherein a signal to noise ratio (SNR) at said respective analog input is less than one.

9. The wireless receiver of claim 1 further comprising a digital beamforming block coupled to said digital outputs of said plurality of one-bit A/D converters.

10. A wireless receiver comprising:
an antenna panel comprising a plurality of antennas;
a plurality of one-bit analog-to-digital (A/D) converters;
at least some of said plurality of antennas being coupled to a corresponding one of said plurality of one-bit A/D converters;
wherein said plurality of one-bit A/D converters are configured to provide digital outputs based on comparing a respective reference value with a respective sum of noise value and signal value of a respective analog input received by each said plurality of one-bit A/D converters;
wherein said respective reference value is selected based on said noise value;
wherein said plurality of antennas receive signals from multiple wireless transmitters, and wherein a signal to noise ratio (SNR) at said respective analog input is greater than one.

11. The wireless receiver of claim 10, wherein said one-bit A/D converter comprises a comparator receiving said sum of said noise value and said signal value as one comparator input, and receiving said reference value as another comparator input.

12. The wireless receiver of claim 10, wherein said plurality of antennas receive uncorrelated noise.

13. The wireless receiver of claim 10 further comprising a digital beamforming block coupled to said digital outputs of said plurality of one-bit A/D converters.

* * * * *